United States Patent
Hoines

(10) Patent No.: US 6,179,454 B1
(45) Date of Patent: Jan. 30, 2001

(54) ILLUMINATION SYSTEM FOR VEHICLE RUNNING BOARDS AND THE AREA BELOW THE RUNNING BOARD

(75) Inventor: Lilian M. Hoines, Sandia Park, NM (US)

(73) Assignee: North American Lighting, Inc., Farmington Hills, MI (US)

(*) Notice: Under 35 U.S.C. 154(b), the term of this patent shall be extended for 0 days.

(21) Appl. No.: 09/245,171

(22) Filed: Feb. 5, 1999

Related U.S. Application Data

(60) Provisional application No. 60/073,960, filed on Feb. 6, 1998.

(51) Int. Cl.[7] .................................................. B60Q 1/24
(52) U.S. Cl. ........................... 362/495; 362/31; 362/551; 362/559; 362/511
(58) Field of Search ..................... 362/551, 554, 362/583, 560, 581, 487, 495, 511, 31, 559

(56) References Cited

U.S. PATENT DOCUMENTS

| | | |
|---|---|---|
| 2,214,447 | 9/1940 | Bave . |
| 2,561,756 * | 7/1951 | Shook .................................. 362/495 |
| 2,696,027 | 12/1954 | Ryland . |
| 4,394,714 | 7/1983 | Rote . |
| 4,463,962 | 8/1984 | Snyder . |
| 4,763,984 | 8/1988 | Awai et al. . |
| 4,819,136 | 4/1989 | Ramsey . |
| 4,924,612 | 5/1990 | Kopelman . |
| 4,965,704 | 10/1990 | Osborne, Sr. . |
| 4,977,487 | 12/1990 | Okano . |
| 4,985,810 | 1/1991 | Ramsey . |
| 5,165,774 | 11/1992 | Windross . |
| 5,400,224 * | 3/1995 | DuNah et al. ........................ 362/31 |
| 5,678,914 | 10/1997 | Dealey et al. . |
| 5,915,830 * | 6/1999 | Dickson et al. ..................... 362/495 |

* cited by examiner

Primary Examiner—Sandra O'Shea
Assistant Examiner—Ismael Negron
(74) Attorney, Agent, or Firm—McDonnell Boehnen Hulbert & Berghoff; Thomas E. Wettermann

(57) ABSTRACT

An elongated light guide courtesy lamp for a vehicle. The lamp includes a light source mounted on the vehicle and an elongated light conductor for conducting light generated by the light source. The light conducted from the conductor is used to illuminate the running board of the vehicle or the area below the running step of the vehicle.

8 Claims, 1 Drawing Sheet

ILLUMINATION SYSTEM FOR VEHICLE RUNNING BOARDS AND THE AREA BELOW THE RUNNING BOARD

CROSS-REFERENCE TO RELATED APPLICATION

This application claims the benefit of United States Provisional Application Ser. No. 60/073,960 filed on Feb. 6, 1998.

TECHNICAL FIELD

This invention relates to the art of vehicle lighting. In particular the invention relates to devices for illuminating areas on or immediately adjacent an automobile.

BACKGROUND OF THE INVENTION

The provision of devices for illumination of automobiles is known. For example, it is known to place lighting devices for illuminating the interior of the automobile. It is also known to place lighting devices to illuminate the area immediately adjacent the automobile. An example of this latter device is a lamp placed on the inside of a door and activated to illuminate the area beneath the door when it is open.

Another example of a known lighting device includes an elongate lighting strip that is placed on a plate extending upward from a running board step. The lighting strip in that device comprises a hollow tubular element with a plurality of individual light bulbs in the cavity. Other running board lighting systems attach discrete lighting elements to various parts of the running board or to separate elements that are attached to the running board.

SUMMARY OF THE INVENTION

In accordance with the invention, an elongate light conductor is designed such that light directed into the light conductor at one location will emanate from the side of the light conductor to illuminate a first area and from the end of the light conductor to illuminate a second, distinct area. In a preferred embodiment, the light conductor is placed with respect to an automobile such that the light emanating from the side of the light conductor illuminates an elongate area while the light emanating from the end of the light conductor illuminates a smaller area. The areas may, however, be of similar sizes or the area illuminated by the light from the side of the light conductor may be smaller.

In a particular embodiment, the light conductor of the invention is mounted to the side of a vehicle having a running board or step. The light conductor is placed such that a central portion of the light conductor extends along the upper side of the running board, and one or both ends extend below the running board. The central portion of the light conductor is designed such that light in the light conductor will emanate from the sides and illuminate the upper surface of the running board to assist those entering or leaving the vehicle in using the running board. The light conductor is also designed such that light emanating from the ends of the light conductor will illuminate the ground immediately adjacent the vehicle to help users step over obstacles, such as puddles.

A light conductor for illuminating a step as well as the ground adjacent the step can have a variety of cross sectional shapes. For example, it can round but can have other shapes as well. The cross sectional dimension may vary over a wide range. Applicant has found a round light conductor with diameters of from 5 mm to 12.7 mm to provide good results. The light conductor may be case or extruded and made of a variety of optical materials. The primary criteria are that the material be capable of transmitting and guiding the light, primarily by total internal reflection, and of emitting a portion of the light from the side of the light conductor. For example, the light conductor may be made of hard acrylic or other clear materials. When the light conductor is for use with a running board, it may be about five feet in length with a bend near one end to provide a section of about one-foot in length that extends transverse to the longer portion. The outer surface of the longer portion is treated such that some of the light flowing along the light conductor is directed outwardly from the side of the light conductor along the length of this portion. In this embodiment, light is introduced at one end of the light conductor, and light that does not pass outwardly from the side of the light conductor (and is not absorbed or otherwise lost) exits the far end of the light conductor. The light conductor is mounted to the side of the vehicle just above the step so that the longer portion extends along the step and the shorter portion extends through the step to orient the far end so that light emanating from it will illuminate the ground adjacent the step.

In this arrangement, the light-conducting light conductor can be placed about 1.5 inches above the running board, which requires an angle of illumination of from about 60° to 80°, measured from the vertical. This illumination pattern can be obtained by providing a peripheral portion of the outer surface of the light conductor with a strip containing scattering centers, or optical disturbances. These scattering centers may be formed by a random roughness, such as that provided by sanding, sandblasting, chemical etching, or molding a light guide in a mold that has undergone one of these treatments. The scattering centers can also be created by attaching an external element to the light conductor. One such element is a tape that can be adhered to the conductor to create the scattering centers from partial index matching at the adhesion boundary. The scattering centers are alternatively created by controlled optical elements placed in the light conductor. For example, these elements may be formed by cutting, molding, or impressing at high temperatures. The elements are preferably small and are in the shape of cones, notches, saw-teeth, etc. Other techniques for creating the scattering centers will be apparent to those of skill in the art.

In one embodiment, the light conductor is a single element with a light source coupled to one end and light emanating from the other end to illuminate the ground. In another embodiment, the light conductor is made of two elements, each of which is shorter than the light conductor of the first embodiment. The light source in this embodiment will be placed between the light conductors such that it directs light into both light conductors simultaneously. Both light conductors may have transverse portions for extending below the running board to illuminate the ground, or only one of the light conductors may be provided with that feature.

The ends of the light conductor, or conductors, may be shaped as known in the art to achieve the efficient coupling of the light at one end and the formation of the desired light pattern at the other. Thus, the far end of the light conductor may be spherical, cylindrical, or other shapes that provide a pattern that illuminates the desired area beneath the step.

The light conductor may also be made of a cylindrical central portion and a prismatic end portion, which is preferably mirrored, attached thereto for directing the light through the running board and onto the ground. As well, a mirrored element can be placed to direct light emanating from the light conductor onto the ground in the desired pattern.

It should also be understood that the light conductor need not actually pass through the running board itself. The light conductor can be directed through another part of the vehicle or around vehicle light conductors. It is also possible to provide several light conductors, each of which has its own source of illumination and provides a portion of the illumination. For example one fiber could be used for illumination of the step and another for illumination of the ground.

DETAILED DESCRIPTION OF THE PREFERRED EMBODIMENTS

Figure 1:
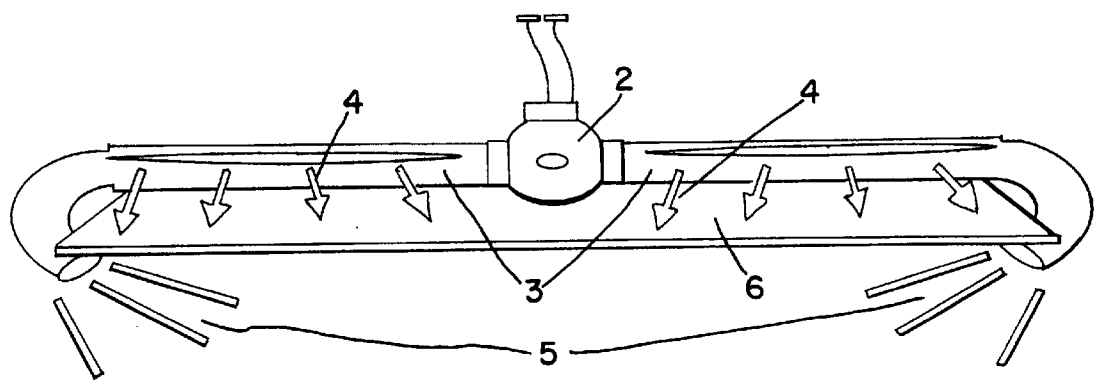
FIG. 1 is a perspective of a first embodiment of the invention.

With reference to FIG. 1, a device for illumination of both the upper part of a running board and the ground beneath the running board comprises first and second light fibers 3 with inner ends coupled to a light source 2 and outer ends bent downward. The light guides are configured such that a portion of the light that has been coupled into the guides flows out of the side to provide light pattern 4 that illuminates the upper part of the running board 6. The remainder of the light passes through the ends of the guide to form light pattern 5 for illuminating the ground beneath the running board.

Many placements of the light guide will be suitable, but the guide is best placed slightly above the surface and on the vehicle side of the surface. This produces the most efficient reflection of light from the surface to the user. If desired, a reflector or shade may be placed above the light guide to shield it from view and to enhance the performance by directing light onto the desired area. The light conductor may also bend to follow the contour of the vehicle's surface.

Figure 2:
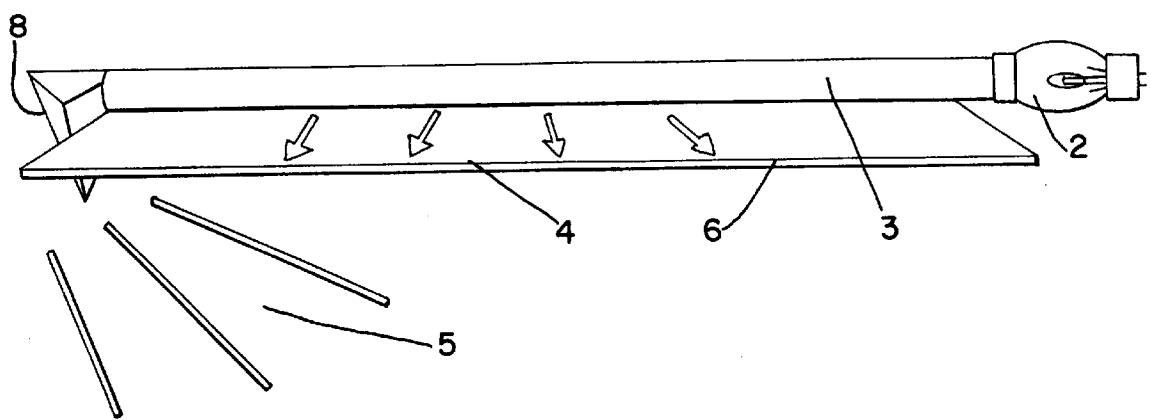
FIG. 2 is a perspective of a second embodiment of the invention.

FIG. 2 shows an arrangement similar to that of FIG. 1, except that the light guide is made of a first cylindrical light conductor and a prismatic light conductor 8 at one end for directing light exiting one end of the cylindrical light conductor onto the ground.

I claim:

1. An elongated vehicle light comprising:
   a light source;
   an elongated light conductor mounted to a side of a vehicle and coupled to said light source;
   a first portion of said elongated light conductor extending along a vehicle running board and illuminating said running board; and
   a second portion of said elongated light conductor located adjacent said first portion of said elongated light conductor and illuminating an area beneath said running board.

2. An elongated light guide courtesy lamp for a vehicle comprising:
   a light source mounted in said vehicle;
   an elongated light conductor for conducting light generated by said light source; said conductor mounted adjacent a running step of said vehicle;
   a first portion of said light conductor extending along an upper side of said running step; and
   an end portion of said light conductor located at an end of said first portion;
   such that light conducted from said light source and conducted by a central portion illuminates an area below said running step of said vehicle.

3. The invention of claim 2 wherein the elongated light conductor has a circular cross sectional configuration.

4. The invention of claim 2 further comprising a peripheral portion on an outer surface of said elongated light conductor for generating an illumination pattern.

5. The invention of claim 2 wherein the elongated light conductor comprises a single conducting element.

6. The invention of claim 2 wherein the end portion of said elongated light conductor comprises a prismatic light conductor for directing light exiting one end of light conductor onto any area below the step.

7. The invention of claim 2 wherein the elongated light conductor comprises a first and a second conducting element.

8. The invention of claim 7 wherein the light source is placed between the first and the second light conducting element such that light generated by said light source is directed into both light conductors simultaneously.

* * * * *